United States Patent Office 3,132,124
Patented May 5, 1964

3,132,124
COPOLYMERIZATION OF TETRAFLUOROETHYL-
ENE AND HEXAFLUOROPROPYLENE
Maurice Joseph Couture, Parkersburg, W. Va., Darrel Lee
Schindler, Orange, Tex., and Robert Bruce Weiser,
Parkersburg, W. Va., assignors to E. I. du Pont de
Nemours and Company, Wilmington, Del., a corporation of Delaware
No Drawing. Filed July 6, 1961, Ser. No. 122,078
15 Claims. (Cl. 260—87.7)

This invention relates to an improved process for the copolymerization of tetrafluoroethylene and hexafluoropropylene.

It heretofore has been recognized that although tetrafluoroethylene homopolymers exhibit excellent chemical and thermal stabilities, they are somewhat difficult to fabricate because of their high softening points. Copolymers of tetrafluoroethylene, on the other hand, using hexafluoropropylene as the comonomer, while retaining most of the physical characteristics of polytetrafluoroethylene, offer an advantage in many applications because they are more readily melt fabricable. Because of the increasing commercial importance of these copolymers, a need has arisen for a more satisfactory and economical method of manufacture.

It is an object of the present invention to provide an improved method for the preparation of copolymers of tetrafluoroethylene and hexafluoropropylene. It is a further object to prepare these copolymers in the form of aqueous dispersions having increased solids contents. A still further object is to produce these copolymers at rates which are faster than those realized in the procedures described by the prior art. Another object of the present invention is to provide a process which yields tetrafluoroethylene - hexafluoropropylene copolymers which have useful molecular weights and compositions. A still further object is to improve the efficiency of the copolymerization so that the amount of unconverted comonomers which must be recycled is substantially reduced. Other objects will become apparent hereinafter.

The objects of the invention are achieved by conducting the polymerization of the mixed comonomers, tetrafluoroethylene and hexafluoropropylene, at 95 to 138° C. in an aqueous system in the presence of a dispersing agent and using a free radical polymerization initiator, with the vapor space density of the mixed comonomers being maintained at 0.18 to 0.30 grams/cc.

In most copolymerizations composition is determined by the ratio and reactivities of comonomers in the reactant mixture, while molecular weight is controlled by such variables as temperature, pressure and type and concentration of initiator. A limiting factor in the preparation of polymers by dispersion techniques is the maximum concentration of polymer in dispersion which can be realized without deleterious coagulation. In order to minimize this coagulation tendency dispersing agents frequently are employed. In the present invention it has been discovered that by employing an unusual combination of temperature, pressure, comonomer mixture vapor space density, polymerization initiator, initiator concentration, initiator scheduling and dispersing agent concentration, it is possible to achieve a useful combination of polymerization rate, copolymer composition and copolymer dispersion concentration. It further has been found that the properties of the products thus prepared are not completely consistent with the properties of the materials prepared by the methods known to the art. The effect of each of the variables will be described.

Temperature is a recognized critical variable in free radical polymerizations. Whereas it is known that increased temperatures normally provide increased reaction rates, the temperature employed in the copolymerization of tetrafluoroethylene and hexafluoropropylene by means of the present invention has been found to exhibit an unusual influence on polymerization rate between about 95 and 138° C. At an operating total pressure of 600 p.s.i.g., for example, an optimum level is reached, as is shown in Table I, at about 119° C., with variations of less than 10% from this optimum rate at between 110 and 127° C. and less than 5%, at between 113 and 123° C. This unusual criticality of temperature has been heretofore unrecognized in prior art processes such as that described, for example, in U.S. Patent 2,946,763.

TABLE I

Effect of Temperature on Polymerization Rate of Hexafluoropropylene-Tetrafluoroethylene Mixtures Specific melt viscosity: $7.5 \times 10^4$ poises
Specific I.R.: 3.5
0.1% dispersing agent
74 wt. percent hexafluoropropylene in comonomer mixture
Vapor space density: 0.355 to 0.208 g./cc.
Pressure: 600 p.s.i.g.

| Temperature (° C.): | Relative Reaction Rate (at 95° C.=1) |
|---|---|
| 95 | 1.00 |
| 100 | 1.05 |
| 105 | 1.85 |
| 110 | 2.12 |
| 115 | 2.28 |
| 119 | 2.31 |
| 125 | 2.20 |
| 130 | 1.91 |
| 135 | 1.45 |
| 138 | 1.00 |

Comonomer vapor space density, per se, usually is not considered in copolymerization processes. The conditions commonly are adjusted with regard to temperature, pressure and composition of the comonomer mixture so as to produce the desired copolymer. Although it is recognized that these variables affect density, it has been found in the present invention that although polymerization rate, copolymer composition and molecular weight can be controlled by the mixed comonomer vapor space density, the latter exhibits an unusual influence between about 0.18 and 0.30 gram/cc., and when the temperature is maintained at about 120° C.; for example, especially between 0.20 and 0.25 gram/cc., with the optimum level at about 0.22–0.23 gram/cc. Table II depicts the relationship between relative reaction rate and comonomer vapor space density at 120° C. in the preparation of copolymers having a specific melt viscosity of $7.5 \times 10^4$ poises and a specific I.R. ratio (both described infra) of 3.5.

TABLE II

Effect of Comonomer Mixture Vapor Space Density on Polymerization Rate of Hexafluoropropylene-Tetrafluoroethylene Mixtures Specific melt viscosity: $7.5 \times 10^4$ poises
Specific I.R.: 3.5
0.15% dispersing agent
Pressure and composition of comonomer mixture: variable
Temperature: 120° C.

| Vapor space density (g./cc) | Relative reaction rate (at density of 0.22=1) |
|---|---|
| 0.19 | 0.73 |
| 0.21 | 0.96 |
| 0.22 | 1.00 |
| 0.23 | 0.62 |
| 0.30 | 0.56 |

Useful copolymers of tetrafluoroethylene and hexafluoropropylene having melt viscosities in the range $1.5 \times 10^3$ to $1.5 \times 10^6$ poises and specific I.R. ratios from 1.5 to 6.0 can be prepared from 95 to 138° C. while maintaining the vapor space density in the aforementioned range of 0.18 to 0.30 gram/cc.

The range of pressures under which the present process is operated is, of course, limited by the aforementioned variables, namely, temperature and comonomer vapor space density and, also, comonomer mixture composition. The limits previously set for these variables may be met by maintaining the pressure at between 400 and 750 p.s.i.g., but at the preferred temperature range of 110 to 127° C., preferably between 550 and 625 p.s.i.g., with the optimum pressure being about 575–600 p.s.i.g. The rate thus may be seen to peak in the same manner, based on pressure, as it did for the aforementioned mixed comonomer vapor space density.

The range of mixed comonomer compositions, likewise, is determined essentially by the variables previously defined, but usually is such as to include 25 to 95 wt. percent hexafluoropropylene. It has been noted, however, that mass transfer will vary depending upon the composition. Particularly at high hexafluoropropylene contents, therefore high vapor densities, mass transfer becomes increasingly difficult. This effect usually is overcome by increasing agitation rates.

A further feature of this invention is the unusual effect of initiator concentration on polymerization rate. The concentration of polymerization initiator in dispersion polymerizations normally is controlled to determine polymer molecular weight rather than polymerization rate. In some cases where a required amount of initiator is employed to achieve a satisfactory molecular weight, the rate of polymerization may be slower than desired. It has been discovered that by using programmed scheduling of an amount of initiator that is in excess of that required to achieve the goal product molecular weight, a substantial increase in rate may be realized. This is effected by precharging initiator and hexafluoropropylene in order to obtain increased particle nucleation prior to the addition of tetrafluoroethylene. After nucleation is complete tetrafluoroethylene and the standard amount of initiator are added continuously during the polymerization cycle. In order to prevent the precharged initiator from adversely affecting product molecular weight it is essential that the excess be destroyed immediately after the nucleation stage to preclude carryover into the polymerization stage. Such a result is achieved by selecting a polymerization temperature at which the initiator half-life is extremely small. This temperature will, therefore, be determined by the initiator employed. Conversely, if a specific temperature is chosen, an initiator having a short half-life at this temperature must be selected. It has been found that the amount of precharged initiator necessary to provide sufficient nucleation to give the increased polymerization rates must exceed a minimum quantity. The minimum quantity generally will be between 6.5 and 7.5 wt. percent of the total added during the polymerization stage. Since the latter will vary with the molecular weight, the minimum weight percent will, of course, be higher than the above for the high molecular weight products. The maximum quantity is critical only in that active initiator must not carry over into the polymerization stage, but usually does not exceed 65 to 75 wt. percent of that added during polymerization. The quantity of initiator injected during the polymerization stage is such as to provide a free radial generation rate of $4 \times 10^{-3}$ to $3 \times 10^{-6}$ moles per minute per liter of solution at reaction conditions. The polymerization initiator may be any water soluble, free radical-producing compound such as a peroxide, persulfate, azo compound and the like, which has a half-life at reaction condition of between 95 and 138° C. of less than 9.0 minutes and preferably less than 2.0 minutes, with an optimum half-life of less than 1.0 minute. In general, the minimum half-life is determined by the dimensions and shape of the equipment and the volumes of initiator solutions which can be handled conveniently. Normally, the half-life should not be less than 0.1 minute at reaction conditions. In the present process it has been found advantageous to employ ammonium persulfate or potassium persulfate as initiators.

Dispersing agents commonly are employed to increase the non-coagulated solids content of polymers prepared by aqueous dispersion techniques. In the present invention it has been discovered that the polymerization rate, the polymer composition and molecular weight may be controlled by means of added dispersing agents. Table III shows the effect of dispersing agent on the relative polymerization rate at 120° C. Table IV relates the effect of dispersing agent on rate to the copolymer composition at 120° C. From this it is evident that the addition of dispersing agent may be covered to achieve a higher specific I.R. ratio by holding the production rate constant or to achieve a higher production rate while maintaining a constant specific I.R. ratio. Table V shows the increased range of molecular weights and compositions which are attainable using the dispersing agent, while Table VI exemplifies the range of polymer production rates, compositions and comonomer vapor compositions which may be covered with the addition of 0.1% dispersing agent. By comparison, the most useful copolymers prepared without the dispersing agent have limited production rates of about 100 grams per liter hour for the range of variables shown.

TABLE III

*Effect of Dispersing Agent on Polymerization Rate of Hexafluoropropylene-Tetrafluoroethylene Mixtures*

Specific melt viscosity: $7.5 \times 10^4$ poises
Specific I.R.: 3.5
75 wt. percent hexafluoropropylene in comonomer mixture
Vapor space density: 0.235 g./cc.
Pressure: 600 p.s.i.g.
Temperature: 120° C.
Dispersing agent: ammonium 9H-hexadecafluorononanoate

| Wt. percent agent: | Relative reaction rate (at 0% agent=1) |
|---|---|
| 0.0 | 1.00 |
| 0.1 | 2.25 |
| 0.2 | 3.55 |
| 0.3 | 4.85 |
| 0.4 | 6.10 |
| 1.0 | 12.75 |
| 1.5 | 19.13 |

TABLE IV

*Effect of Dispersing Agent on Hexafluoropropylene-Tetrafluoroethylene Copolymer Composition*

Specific melt viscosity: $7.5 \times 10^4$ poises
75 wt. percent hexafluoropropylene in comonomer mixture
Vapor space density: 0.235 g./cc.
Pressure: 600 p.s.i.g.
Temperature: 120° C.
Dispersing agent: ammonium 9H-hexadecafluorononanoate

| Rate | Specific I.R. ratio | | |
|---|---|---|---|
| | At 100 g./liter-hour | At 200 g./liter-hour | At 300 g./liter-hour |
| Wt. percent agent: | | | |
| 0 | 3.50 | 2.92 | |
| 0.05 | 3.89 | 3.21 | |
| 0.10 | 4.17 | 3.50 | |
| 0.15 | 4.38 | 3.77 | 3.29 |
| 0.20 | 4.52 | 3.98 | 3.52 |
| 0.25 | | 4.15 | 3.73 |
| 0.30 | | 4.23 | 3.91 |
| 0.35 | | 4.36 | 4.03 |
| 0.40 | | 4.43 | 4.13 |
| 0.45 | | | 4.22 |

TABLE V

*Effect of Dispersing Agent on Melt Viscosity and Specific I.R. Ratio for Hexafluoropropylene-Tetrafluoroethylene Copolymers*

75 wt. percent hexafluoropropylene in comonomer mixture
Constant polymerization rate
Pressure: 600 p.s.i.g.
Temperature: 120° C.
Dispersing agent: ammonium 9H-hexadecafluorononanoate

| Melt viscosity (poises×10⁻⁴) | Specific I.R. ratio | |
|---|---|---|
| | No dispersing agent | 0.1% dispersing agent |
| 20 | 2.68 | 2.86 |
| 15 | 2.74 | 2.98 |
| 10 | 2.82 | 31.4 |
| 6 | 2.94 | 3.34 |
| 3 | 3.08 | 3.62 |
| 1.5 | 3.22 | 3.88 |

TABLE VI

*Relationship of Mixed Comonomer Vapor Composition, Specific I.R. Ratio and Production Rate*

Specific melt viscosity: 7.5×10⁴ poises
Pressure: 600 p.s.i.g.
Temperature: 120° C.
0.1% dispersing agent

| Specific I.R. ratio | Wt. percent hexafluoropropylene in vapro space | | |
|---|---|---|---|
| | 3.8 | 3.5 | 3.2 |
| Production rate (g./liter-hour): | | | |
| 150 | 70.0 | 59.6 | |
| 200 | 82.4 | 68.6 | 58.5 |
| 250 | | 77.6 | 65.0 |
| 300 | | 86.5 | 71.3 |

A further advantage arising from the use of dispersing agents is the increased efficiency of comonomer utilization. Because of this increased utilization the amount of unconverted comonomers which must be recovered and recycled is reduced by about a factor of two. In the present invention this reduction is facilitated by lowering the amount of hexafluoropropylene in the comonomer mixture by about 10%. For example, the amount of hexafluoropropylene in a comonomer mixture which normally is required to achieve a specific I.R. ratio of 3.5 can be reduced from 78–86 wt. percent to 70–78 wt. percent. The dispersing agent used is not critical in the present invention although the amount employed may have to be varied to compensate for variations in water solubility, nature of the hydrophilic and hydrophobic groups and the like. In general, the dispersing agent should have a solubility in water of at least 0.1 wt. percent at reaction conditions, and preferably at least 0.5 wt. percent. Those which have been found very effective are those containing a hydrophilic group and a hydrophobic portion, said latter being a fluoroalkyl group containing at least six carbon atoms, with each carbon atom except the ones alpha and omega to the hydrophilic group containing two fluorine atoms. The alpha and omega carbon atoms may contain either fluorine or hydrogen. These dispersing agents may be represented by the general formula $B(CF_2)_n(CH_2)_mA$ where B is hydrogen or fluorine, $n$ is an integer at least equal to five, $m$ is zero or one, the sum of $m$ and $n$ is at least equal to 6, and A is an ionic (cationic or anionic) hydrophilic group. The hydrophilic group may be any of the well known anionic or cationic hydrophilic groups commonly incorporated into surface active agents. For example, it may be a free carboxylic, phosphoric, phosphonic or sulfuric acid group or the alkali metal, ammonium or substituted ammonium salt thereof, or an amine or substituted amine group. These dispersing agents are described more fully in U.S. Patent 2,559,752. Examples of salts of the fluoroalkylcarboxylic acids, include the ammonium and alkali metal salts of 7H-dodecafluoroheptanoic acid, 8H-tetradecafluorooctanoic acid, 9H-hexadecafluorononanoic acid, 11H-eicosafluoroundecanoic acid, as well as the ammonium and alkali metal salts of the perfluorinated alkanoic acids. Representative of the other types of dispersing agents, supra, are ammonium 1,1,7H-dodecafluoroheptyl acid phosphate, ammonium 1,1,9H-hexadecafluorononyl acid phosphate, 1,1,7H-dodecafluoroheptyl dihydrogen phosphate, 1,1,9H-hexadecafluorononyl sulfate, sodium 1,1H-heptadecafluorononyl sulfate, 6H-dodecafluorohexyl phosphonic acid, ammonium 8H-hexadecafluorooctyl phosphonate, 1,1,9H-hexadecafluorononylamine sulfate, and the like. The dispersing agent may also be formed in situ by precharging only 5 to 15% of the tetrafluoroethylene usually added immediately after the nucleation stage. After 5 to 15 minutes with polymerization-stage rate of initiator addition to permit formation of the dispersing agent the tetrafluoroethylene charging is continued and the polymerization is completed in the usual manner.

By the term "specific melt viscosity" as used herein, is meant the apparent melt viscosity as measured at 380° C. under a shear stress of 6.5 pounds per square inch. The values herein referred to are determined using a melt indexer of the type described in American Society of Testing Materials test D–1238–57T, modified for corrosion resistance to embody a cylinder and orifice of "Ampco" aluminum bronze and a piston weighing 60 grams, having a "Stellite" cobalt-chromium-tungsten alloy tip. The resin is charged to the 0.375 inch I.D. cylinder which is held at 380° C.±0.5° C., allowed to come to an equilibrium temperature during 5 minutes, and extruded through the 0.0825 inch diameter, 0.315 inch long orifice under a piston loading of 5000 grams. The specific melt viscosity in poises is calculated as 53,150 divided by the observed extrusion rate in grams per minute.

The term "specific I.R. ratio" as used herein refers to the net absorbance in the infra-red at a wave length of 10.18 microns divided by the net absorbance in the infra-red at a wave length of 4.25 microns, of a film about 2 mils thick obtained by melting, pressing and water quenching a sample of the resin. The values herein referred to are determined on film prepared by melting a 0.5 gram sample of the resin at 340° C., pressing the melted sample during one minute at 340° C. under 40,000 pounds force between the shiny sides of 5" square aluminum sheets having a combined thickness of 3 mils in a 6" square, 5 mil deep cavity of a mold assembly consisting of superposed flat platens separated by a centrally apertured spaced sheet, quenching the mold assembly in ice water, and dissolving the adherent aluminum foil away from the resulting film in hot (90–100° C.) aqueous, 10 percent sodium hydroxide solution. A clear portion of the film is mounted on the sample holder of a recording infra-red spectrometer, and scanned in the ranges of from 3.5 to 5 microns and from 9.5 to 12 microns while flushing the sample holder with nitrogen. The net absorbances at 10.18 and 4.25 microns are measured in the conventional way. From correlations with material balances during resin synthesis and analyses of the products of controlled resin decompositions, it has been indicated that the specific I.R. ratio when multiplied by 4.5 is numerically equal to the weight percent of combined hexafluoropropylene contained in the resin.

The following examples are given to illustrate but not limit the various features of the present invention.

SUMMARY OF EXAMPLES

| No. | Percent dispersing agent | HFP precharge (p.s.i.g.) | Vapor density | Percent HFP | Initiator Scheduling | Polmn. initiator sol. concentration (molal) | Radical gen. rate (÷10⁻⁵) moles/min./liter | Dispersion solids content | Spec. melt visc. (poises ×10⁻⁴) | Spec. I.R. | Rel. Polmn. rate |
|---|---|---|---|---|---|---|---|---|---|---|---|
| 1 | 0 | 390 | 0.235 | 75 | Regular | 0.007 | 2.14 | 7.3 | 7.5 | 3.5 | 1.0 |
| 2 | 0 | 390 | 0.23 | 74 | High Initial | 0.0096 | 1.24 | 18 | 7.5 | 3.5 | 1.2 |
| 3 | 0.1 | 390 | 0.23 | 74 | ___do___ | 0.02 | 2.6 | 18 | 7.5 | 3.5 | 2.4 |
| 4 | 0.2 | 390 | 0.23 | 74 | ___do___ | 0.031 | 4.03 | 18 | 7.5 | 3.5 | 3.7 |
| 5 | 0.2 | 390 | 0.23 | 74 | ___do___ | 0.02 | 2.6 | 18 | 7.5 | 4.0 | 2.4 |
| 6 | 0.2 | 255 | 0.19 | 52.5 | ___do___ | 0.02 | 2.6 | 18 | 7.5 | 3.5 | 2.4 |
| 7 | 0.1 | 255 | 0.19 | 52.5 | ___do___ | 0.01 | 1.3 | 18 | 7.5 | 3.5 | 1.2 |
| 8 | 0.1 | 418 | 0.24 | 77.5 | ___do___ | 0.0125 | 1.63 | 18 | 7.5 | 3.5 | 1.5 |
| 9 | 0.1 | 390 | 0.23 | 74 | Low Initial | 0.00174 | 0.285 | 9.4 | 120 | 3.6 | 0.8 |
| 10 | 0.1 | 390 | 0.23 | 74 | High Initial | 0.0037 | 0.605 | 9.4 | 120 | 3.8 | 1.7 |

EXAMPLE 1

A cylindrical, horizontally disposed, water-jacketed, paddle-stirred, stainless steel reactor having a length to diameter ratio of about 1.5 and a water capacity of 80.7 parts is evacuated, charged with 46 parts of demineralized water and purged of gases by warming the charge and evacuating the reactor free space. The degasified charge is heated to 95° C., pressured to 390 p.s.i.g. with deoxygenated hexafluoropropylene, made $2.9 \times 10^{-4}$ molal with respect to potassium persulfate by rapid addition of freshly prepared 0.011 molal solution of potassium persulfate in demineralized water, and then stirred for 15 minutes at 95° C. At the end of the 15 minutes, the reactor is pressured to 650 p.s.i.g. with deoxygenated tetrafluoroethylene so as to achieve a mixture of comonomers which is 75 wt. percent hexafluoropropylene and 25 wt. percent tetrafluoroethylene. A freshly prepared 0.007 molal solution of potassium persulfate is injected at the rate of 0.0437 part per minute so that the rate of active radical generation is maintained at about $2.14 \times 10^{-5}$ moles per minute per liter of solution. The stirring of the reactor contents at 95° C. and the addition of potassium persulfate are continued for 100 minutes after the 650 p.s.i.g. total pressure is attained; during this period the pressure is maintained constant by the continuous addition of tetrafluoroethylene. At the end of 100 minutes the stirring is stopped, the vapor in the reactor is sampled, the reactor is vented and its residual contents is discharged.

There is obtained an aqueous dispersion containing 7.3 parts (about 15 wt. percent) of resinous polymeric product. The sample of the vapor space taken from the reactor at the end of 100 minutes is immediately analyzed by infrared techniques and found to contain 75 wt. percent hexafluoropropylene.

The aqueous dispersion is coagulated by stirring to obtain a particulate coagulum which is filtered from the liquid, washed with distilled water and dried. This material has a specific melt viscosity of $7.5 \times 10^4$ poises, and a specific I.R. ratio of 3.5.

EXAMPLE 2

A cylindrical, horizontally disposed, water-jacketed, paddle-stirred, stainless steel reactor having a length to diameter ratio of about 1.5 and a water capacity of 80.7 parts is evacuated, charged with 46 parts of demineralized water and purged of gases by warming the charge and evacuating the reactor free space. The contents of the reactor is heated to 120° C. and the reactor is first pressurized to 390 p.s.i.g. with deoxygenated hexafluoropropylene and then with deoxygenated tetrafluoroethylene to 600 p.s.i.g. total pressure so that the composition of the vapor space is 74 wt. percent hexafluoropropylene and 26 wt. percent tetrafluoroethylene; for a period of 15 minutes during the pressure up a freshly prepared solution of 0.04 molal potassium persulfate is injected at the rate of 0.175 part per minute so that at the end of 15 minutes the calculated concentration of undecomposed persulfate is $7.85 \times 10^{-5}$ molal. At the end of the 15 minutes the rate of potassium persulfate addition is altered by switching to the injection of a freshly prepared 0.0096 molal solution of potassium persulfate at a rate of 0.0437 part per minute so that the rate of active radical generation is maintained at about $1.24 \times 10^{-5}$ moles per minute per liter of solution. The stirring of the reactor contents at 120° C. and the addition of potassium persulfate are continued for 100 minutes after the 600 p.s.i.g. total pressure is attained; during this period the pressure is maintained constant by the continuous addition of tetrafluoroethylene. At the end of 100 minutes the stirring is stopped, the vapor in the reactor is sampled, the reactor is vented and its residual contents is discharged.

There is obtained an aqueous dispersion containing 18 parts (about 37 wt. percent) of resinous polymeric product. The sample of vapor taken from the reactor at the end of 100 minutes is immediately analyzed by infrared techniques and found to contain 74 wt. percent hexafluoropropylene.

EXAMPLES 3–10

Except where the conditions are noted as being different in the Example Summary, Examples 3–10 have been carried out using the procedure of Example 2.

Although it generally has been found that the properties of the copolymers prepared by means of the present invention are the same, for any given composition and molecular weight, as the materials prepared by processes described in the art, it has been noted that the steady-state compliance values of the products prepared by the instant process are substantially lower than those of the products prepared by conventional methods.

We claim:

1. In a process for the preparation of a copolymer of hexafluoropropylene and tetrafluoroethylene in an aqueous dispersion, said copolymer having a specific melt viscosity, as measured at 380° C. under a shear stress of 6.5 pounds per square inch, of between $1.5 \times 10^3$ and $1.5 \times 10^6$ poises and a specific I.R. ratio, as measured on film of about 0.002 inch thickness water-quenched from the molten product, by net absorbance at 10.18 microns wave length divided by net aborbance at 4.25 microns wave length, in the range of 1.5 to 6, the steps which comprise polymerizing a mixture of hexafluoropropylene and tetrafluoroethylene having a vapor density of 0.18 to 0.30 g./cc. at 95 to 138° C. and a total pressure of 400 to 750 p.s.i.g. in an aqueous system containing a dispersing agent having a solubility in water of at least 0.1 wt. percent at reaction conditions and using a water soluble, free radical-producing initiator having a half life at 95 to 138° C. of less than 9.0 minutes, said initiator being present in quantities which are at least 6.5 wt. percent in excess of that required to achieve the desired molecular weight, with the excess being contacted with the initial charge of hexafluoropropylene prior to the addition of tetrafluoroethylene.

2. A process according to claim 1 wherein the temperature is maintained at 110 to 127° C.

3. A process according to claim 1 wherein the temperature is maintained at 113 to 123° C.

4. A process according to claim 1 wherein the mixture of hexafluoropropylene and tetrafluoroethylene has a vapor density of 0.20 to 0.25 g./cc.

5. A process according to claim 1 wherein the total pressure is maintained between 550 and 625 p.s.i.g.

6. A process according to claim 1 wherein the mixture of hexafluoropropylene and tetrafluoroethylene has a vapor density of 0.20 to 0.25 g./cc. at a temperature of 113 to 123° C. and a total pressure of 550 to 625 p.s.i.g.

7. A process according to claim 1 wherein the free radical-producing initiator has a half life at 95 to 138° C. of less than 2.0 minutes.

8. A process according to claim 1 wherein the free radical-producing initiator has a half life at 95 to 138° C. of between 0.1 and 2.0 minutes.

9. A process according to claim 1 wherein the free radical-producing initiator is added at such a rate during the polymerization stage that the rate of active radical formation is between $4 \times 10^{-3}$ and $3 \times 10^{-6}$ moles per minute per liter of solution at reaction conditions.

10. A process according to claim 1 wherein the free radical producing initiator is selected from the group consisting of ammonium persulfate and potassium persulfate.

11. A process according to claim 1 wherein the dispersing agent is formed in situ within the reaction mixture.

12. A process according to claim 1 wherein the dispersing agent is added to the reaction mixture.

13. A process according to claim 1 wherein the dispersing agent is comprised of a hydrophilic group and a hydrophobic group, said hydrophobic group being a fluoroalkyl group containing at least six carbon atoms, with each carbon atom except the ones alpha and omega to the hydrophilic group containing two fluorine atoms, the alpha and omega carbon atoms containing atoms selected from the group consisting of hydrogen and fluorine.

14. A process according to claim 1 wherein the dispersing agent is selected from the group consisting of ammonium 9H-hexadecafluorononanoate and ammonium 8H-tetradecafluorooctanoate.

15. A process according to claim 1 wherein the dispersing agent is present in quantities 0.01 to 1.5% by weight of the aqueous phase.

References Cited in the file of this patent

UNITED STATES PATENTS 2,946,763    Bro et al. _____ July 26, 1960

UNITED STATES PATENT OFFICE
CERTIFICATE OF CORRECTION

Patent No. 3,132,124　　　　　　　　　　　　　May 5, 1964

Maurice Joseph Couture et al.

It is hereby certified that error appears in the above numbered patent requiring correction and that the said Letters Patent should read as corrected below.

Column 3, line 61, after "the", first occurrence, insert -- product --; column 5, TABLE V, third column, line 3 thereof, for "31.4" read -- 3.14 --; same column 5, TABLE VI, in the heading to the second major column, for "vapro" read -- vapor --; column 6, line 59, for "spaced" read -- spacer --; columns 7 and 8, in the table, in the heading to column 8 thereof, for "$(+10^{-5})$" read -- $(\times 10^{-5})$ --; column 8, line 49, for "copylmer" read -- copolymer --.

Signed and sealed this 3rd day of November 1964.

(SEAL)
Attest:

ERNEST W. SWIDER
Attesting Officer

EDWARD J. BRENNER
Commissioner of Patents